US008019189B2

United States Patent
Shimotsu

(10) Patent No.: US 8,019,189 B2
(45) Date of Patent: Sep. 13, 2011

(54) LOW-SPECKLE LIGHT SOURCE DEVICE

(75) Inventor: Shinichi Shimotsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 226 days.

(21) Appl. No.: 12/405,622

(22) Filed: Mar. 17, 2009

(65) Prior Publication Data

US 2009/0232438 A1    Sep. 17, 2009

(30) Foreign Application Priority Data

Mar. 17, 2008   (JP) ................................. 2008-067057

(51) Int. Cl.
*G02B 6/42* (2006.01)
*G02B 6/26* (2006.01)
*G02B 6/30* (2006.01)
*G02F 1/01* (2006.01)
*H01S 3/10* (2006.01)

(52) U.S. Cl. .................. 385/50; 385/1; 385/15; 385/31; 385/49; 372/26

(58) Field of Classification Search .................. None
See application file for complete search history.

(56) References Cited

U.S. PATENT DOCUMENTS

| 4,169,656 A * | 10/1979 | Hodge .............................. 385/44 |
| 7,113,657 B2 | 9/2006 | Park |
| 2003/0002769 A1 * | 1/2003 | Lovely et al. ................... 385/12 |
| 2010/0142041 A1 * | 6/2010 | Berman ......................... 359/385 |

FOREIGN PATENT DOCUMENTS

| JP | 06-167640 A | 6/1994 |
| JP | 2003-156698 A | 5/2003 |

* cited by examiner

*Primary Examiner* — Michelle R Connelly Cushwa
(74) *Attorney, Agent, or Firm* — Sughrue Mion, PLLC

(57) ABSTRACT

A laser light source device which can inexpensively achieve a visually recognizable level of speckle reduction is disclosed. The laser light source device includes: a laser module including a light source and a first optical waveguide, wherein light emitted from the light source is outputted from an output end of the first optical waveguide; a second optical waveguide connected to the first optical waveguide, wherein the light outputted from the output end of the first optical waveguide is inputted to an input end of the second optical waveguide and guided through the second optical waveguide; and an intensity modulation unit disposed in the vicinity of the second optical waveguide, the intensity modulation unit applying intensity modulation to the second optical waveguide, wherein a core diameter at the input end of the second optical waveguide is larger than a core diameter at the output end of the first optical waveguide.

7 Claims, 3 Drawing Sheets

DISTURBANCE (VIBRATION)

LOW-SPECKLE LIGHT SOURCE DEVICE

BACKGROUND OF THE INVENTION

1. Field of the Invention

The present invention relates to a laser light source device, and in particular to a laser light source device having reduced speckle of laser light emitted therefrom.

2. Description of the Related Art

Laser light source devices have conventionally been used as an illumination device for use with an endoscope or interferometer. Such an illumination device is required to provide uniform illumination light. However, an illumination device employing the laser light source device may suffer from degradation of illumination performance caused by an uneven illumination pattern (hereinafter referred to as "speckle") due to coherence of the laser light. Further, in an imaging apparatus employing the laser light source device as the illumination device, the speckle of the laser light may significantly degrade quality of an acquired image.

Japanese Unexamined Patent Publication No. 2003-156698 proposes a laser light source device, in which the speckle of the laser light is reduced by applying vibration to an intermediate portion of a single-core multimode optical fiber. U.S. Pat. No. 7,113,657 proposes a laser light source device provided with a light phase controlling means, which controls the phase of laser light guided through a multimode optical fiber by forming a bend in the multimode optical fiber. Japanese Unexamined Patent Publication No. 6(1994)-167640 proposes a laser light source device, in which the speckle of the laser light is reduced by inputting the laser light to an optical fiber bundle formed by multimode optical fibers having fiber lengths that differ from each other by a length not less than the coherence length, and outputting the laser light from an output end of the optical fiber bundle.

However, since the speckle phenomenon is caused by the coherence of the laser light, if reduction of the coherence of the laser light is insufficient in the laser light source devices disclosed in the above patent documents, the speckle reduction effect of the modulation applied to the mode coupling between multiple modes in the multimode optical fiber may not be visually recognizable. Namely, it has been found that the speckle reduction effect of the laser light source devices disclosed in the above patent documents is not visually recognizable if the laser light guided through the multimode optical fiber has a large residual polarized component. The present invention has been achieved based on this finding.

Further, it is difficult to produce the fiber bundle of fibers, which have fiber lengths that differ from each other by a length not less than the coherence length, in the laser light source device disclosed in the above-mentioned Japanese Unexamined Patent Publication No. 6(1994)-167640, and use of such a fiber bundle may lead to cost increase of the laser light source device.

SUMMARY OF THE INVENTION

In view of the above-described circumstances, the present invention is directed to providing a laser light source device which inexpensively achieves a visually recognizable level of speckle reduction by reducing the coherence of the laser light.

In order to address the above-described problem, an aspect of the laser light source device of the invention includes: a laser module including a light source and a first optical waveguide, wherein light emitted from the light source is outputted from an output end of the first optical waveguide; a second optical waveguide connected to the first optical waveguide, wherein the light outputted from the output end of the first optical waveguide is inputted to an input end of the second optical waveguide and guided through the second optical waveguide; and an intensity modulation unit disposed in the vicinity of the second optical waveguide, the intensity modulation unit applying intensity modulation to the second optical waveguide, wherein a core diameter at the input end of the second optical waveguide is larger than a core diameter at the output end of the first optical waveguide.

In the laser light source device of the invention, the first optical waveguide may be connected to the second optical waveguide in a position where an optical axis at the output end of the first optical waveguide is offset from an optical axis at the input end of the second optical waveguide, and a core at the output end of the first optical waveguide may be positioned within an extent of a core at the input end of the second optical waveguide in the offset position.

The "optical axis" herein refers to the central axis of the core extending along the longitudinal direction of the waveguide. The "offset position" herein means that the optical axes are substantially parallel to each other and have a fixed distance therebetween along a plane substantially perpendicular to the optical axes. The "positioned within an extent of a core" herein means that, when the core at the output end is projected onto the core at the input end, the projected core at the output end is positioned within the extent of the core at the input end.

In the laser light source device of the invention, a cross-sectional area of the core at the output end of the first optical waveguide may be smaller than a cross-sectional area of the core at a position nearer to a light source than the output end.

The "cross-sectional area of the core" herein refers to a cross-sectional area of the core along a plane substantially perpendicular to the optical axis.

In the laser light source device of the invention, the first optical waveguide may be an optical fiber having a core diameter of 33 µm, and the second optical waveguide may be a multimode optical fiber having a core diameter selected from 60 µm, 205 µm and 230 µm. Further, the second optical waveguide may have a fiber length adapted to achieve a residual polarized component of the light outputted from the second optical waveguide of about 30% or less.

In the laser light source device of the invention, the intensity modulation unit may include an actuator for applying vibration. The actuator may be a vibration motor or a piezoelectric device.

DESCRIPTION OF THE PREFERRED EMBODIMENTS

Figure 1:
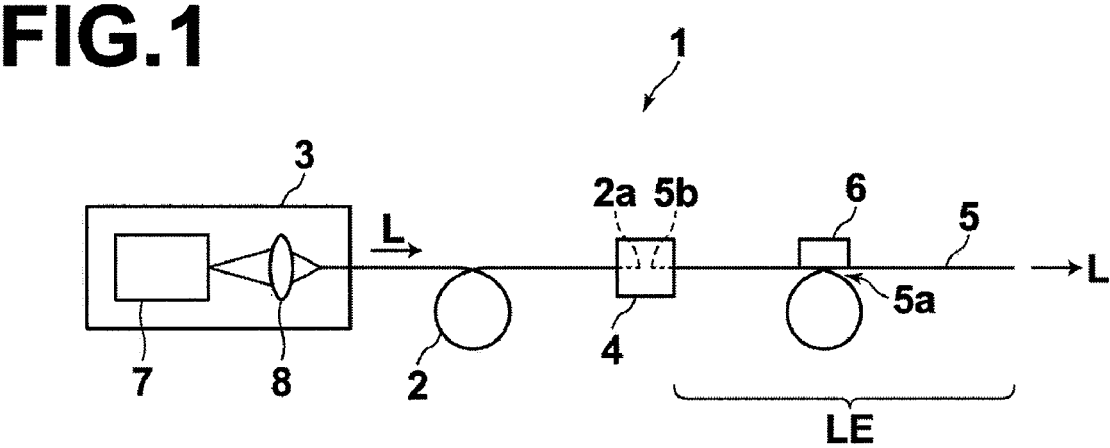
FIG. 1 is a diagram illustrating the schematic configuration of a laser light source device of the present invention.

Hereinafter, a laser light source device of the present invention will be described with reference to the drawings. FIG. 1 illustrates the schematic configuration of a laser light source device 1 of the invention. As shown in FIG. 1, the laser light source device 1 includes: an optical fiber 2; a laser module 3 to emit laser light L to be outputted from the optical fiber 2; a multimode optical fiber 5 connected to the fiber 2 via an optical connector 4; and an actuator 6 to apply vibration to a looped portion 5a of the multimode optical fiber 5.

The laser module 3 includes: a light source unit 7 including a laser package (not shown); and a light collection optical system 8 to collect and direct the laser L emitted from the light source unit 7 into the optical fiber 2. In this embodiment, the laser light L has, as one example, a wavelength of 405 nm and a power of 100 mW, however, this is not intended to limit the invention.

In this embodiment, the optical fiber 2 is a multimode optical fiber having a core diameter of 33 μm and a fiber length LE of 1 m, and the multimode optical fiber 5 has a core diameter of 205 μm and a fiber length LE of 3 m. However, as described later, this is not intended to limit the invention.

Next, the multimode optical fiber 5 used in the laser light source device 1 of the invention is described in detail. Using a measurement system 10 shown in FIG. 2, the present inventor measured the correlation between the fiber length LE and a residual polarized component RP of the laser light L outputted from the multimode optical fiber for each of three multimode optical fibers having different core diameters: 60 μm, 205 μm and 230 μm.

The measurement system 10 is formed by: the above-described laser module 3 including the multimode optical fiber, which is provided in place of the optical fiber 2; an output-side lens 11 to collimate the laser light into parallel light; a polarizer 12; and a power meter 13. The components of the measurement system 10 that are the same as those of the laser light source device 1 are designated by the same reference numerals in FIG. 2, and explanations thereof are omitted.

Figure 2:
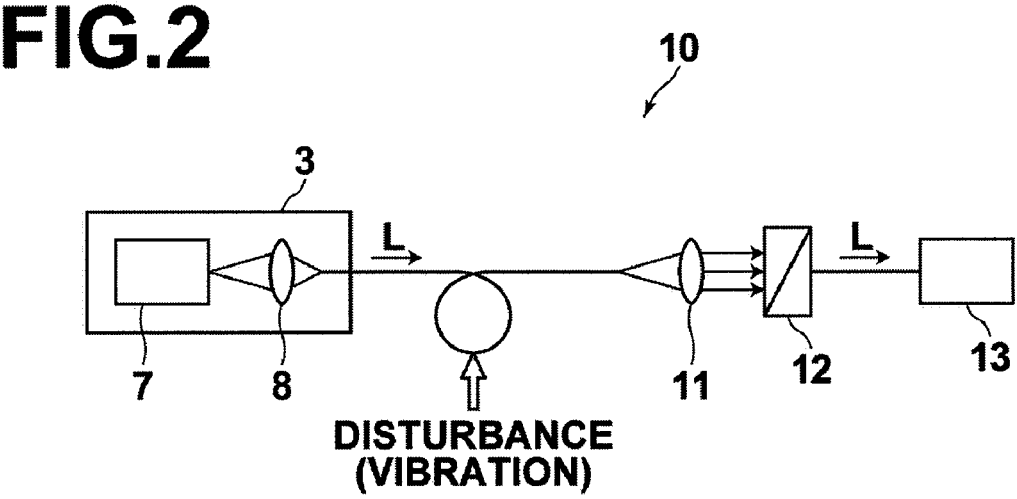
FIG. 2 is a diagram illustrating the schematic configuration of a measurement system for measuring a residual polarized component of laser light L.

To measure the residual polarized component RP, the laser light L emitted from the laser module 3 is inputted to the multimode optical fiber, and the light L guided through the multimode optical fiber is inputted to the polarizer 12 via the output-side lens 11. Then, the power of the laser light L transmitted through the polarizer 12 is measured. As shown in FIG. 2, a disturbance is applied to the multimode optical fiber and fluctuation of the power of the laser light L is measured. Namely, the residual polarized component RP is defined as follows: residual polarized component RP (%)=minimum power/maximum power. Alternatively, accurate measurement of the coherence of the laser light L can be achieved by measuring a degree of polarization (DOP) by removing the polarizer 12 and using a polarization analyzer in place of the power meter 13.

The degree of polarization DOP is defined as follows: degree of polarization $DOP=(S_1^2+S_2^2+S_3^2)^{0.5}/S_0$, wherein $S_0$ represents a total optical power, $S_1$ represents a linear polarized component, $S_2$ represents an inclination component, and $S_3$ represents a circular polarized component.

Figure 3:
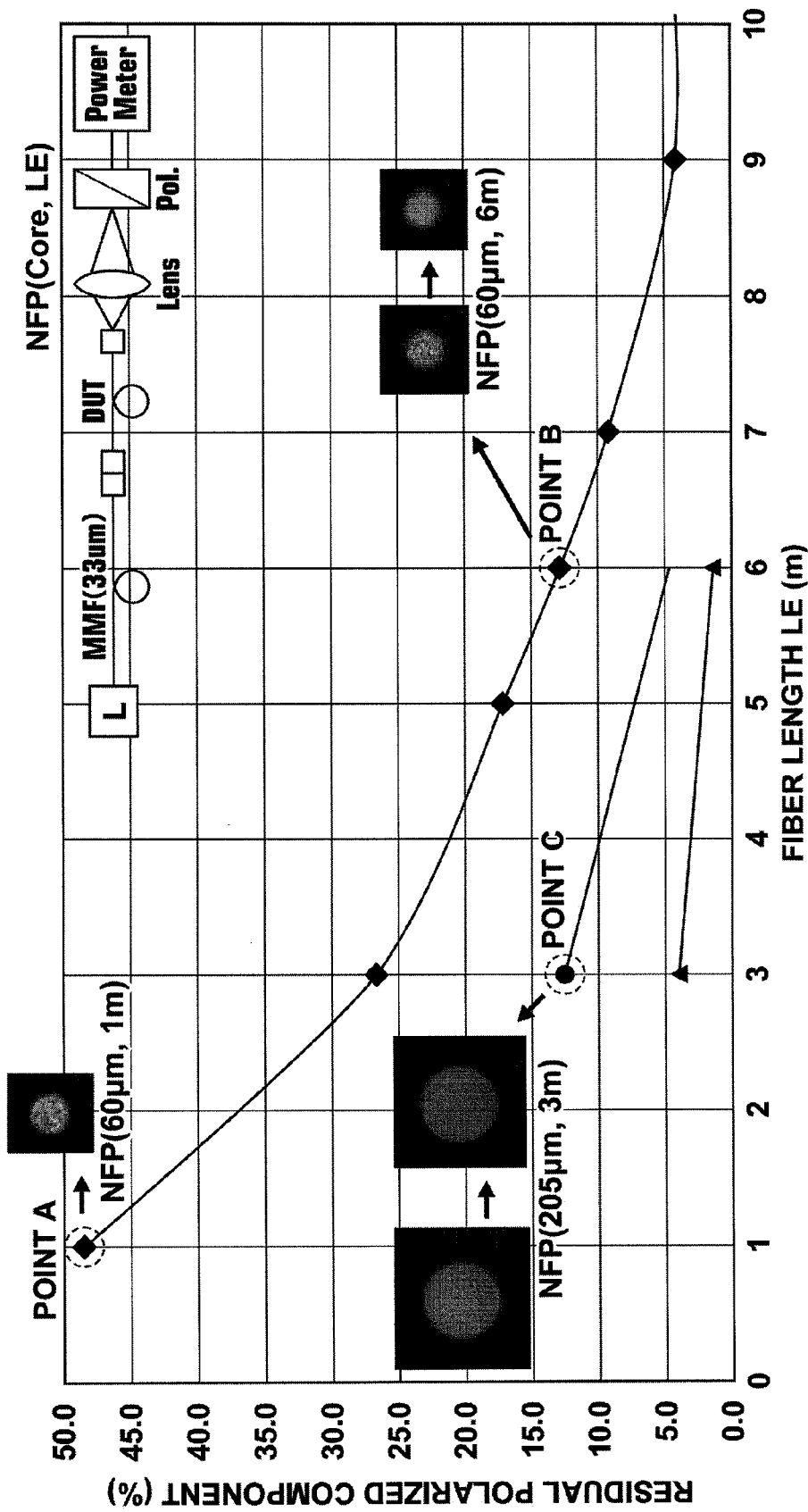
FIG. 3 is a graph showing the correlation between the residual polarized component of the laser light L and a fiber length of a multimode optical fiber.

FIG. 3 shows the correlation between the fiber length LE and the residual polarized component RP of the laser light L outputted from the multimode optical fiber 5, i.e., each of the three multimode optical fibers having different core diameters. As shown in FIG. 3, for the core diameter of 60 μm and the fiber length LE of 1 m (point A in the drawing), the residual polarized component RP of the laser light L outputted from the multimode optical fiber 5 is about 48%. For the core diameter of 60 μm and the fiber length LE of 6 m (point B in the drawing) and for the core diameter of 205 μm and the fiber length LE of 3 m (point C in the drawing), the residual polarized component RP of the laser light L outputted from the multimode optical fiber 5 is about 13%.

Next, near-field patterns NFP, which are obtained by using, as the multimode optical fiber 5 of the laser light source device 1 of the invention, each of the multimode optical fibers having the core diameter and the fiber length LE at each of the above points A-C in the drawing and applying vibration from the actuator 6 to the looped portion 5a of the multimode optical fiber 5, are described. The near-field pattern NFP is observed by connecting a NFP measurement system to the output end of the multimode optical fiber 5 of the laser light source device 1.

FIG. 3 also shows the near-field patterns NFP that are obtained when the multimode optical fibers respectively having the core diameters and the fiber lengths LE at the points A-C in the drawing are used. As shown in FIG. 3, when the residual polarized component RP is around 48% (point A in the drawing), it is difficult to achieve a visually recognizable level of speckle reduction in the near-field pattern NFP by applying the vibration from the actuator 6. On the other hand, when the residual polarized component RP is around 13% (points B and C in the drawing), a visually recognizable level of speckle reduction in the near-field pattern NFP is achieved by applying the vibration from the actuator 6. It should be noted that, in the pairs of near-field patterns NFP shown for points B and C in the drawing, the left near-field pattern NFP of each pair is one obtained before the application of vibration and the right near-field patterns NFP of each pair is one obtained during the application of vibration.

The present inventor has found, after repeated observation of the near-field patterns NFP of the multimode optical fibers having the three different core diameters of 60 μm, 205 μm and 230 μm through the above-described method, that the visually recognizable level of speckle reduction is achieved when the fiber length LE is in the range where the residual polarized component RP of the laser light L outputted from the multimode optical fiber 5 is about 30% or less. The present inventor has further found that the visually recognizable level of speckle reduction is more easily achieved with a larger fiber length LE and a larger core diameter of the multimode optical fiber 5 and a smaller loop diameter of the looped portion 5a. The present inventor has further found that, for the laser light L with a smaller amount of the residual polarized component RP outputted from the multimode optical fiber 5, the visually recognizable level of speckle reduction can be achieved with a smaller amplitude of the applied vibration.

Therefore, the multimode optical fiber 5 of the invention may have a core diameter and a fiber length LE that achieve the residual polarized component RP of the laser light L outputted from the multimode optical fiber 5 of about 30% or less, or optionally about 15% or less.

Further, by making the core diameter at an output end 5b of the multimode optical fiber 5 larger than the core diameter at an input end 2a of the optical fiber 2, a larger optical path difference in the multimode optical fiber 5 is provided for the laser light L inputted to the multimode optical fiber 5, and thus a smaller residual polarized component RP can be achieved.

As described above, the optical fiber 2 in this embodiment is a multimode optical fiber having the core diameter of 33 μm and the fiber length LE of 1 m. However, this is not intended to limit the invention. In the case where the optical fiber 2 is connected to the multimode optical fiber 5 which reduces the residual polarized component RP of the laser light L, the optical fiber 2 may be any optical fiber that can guide the laser light L emitted from the light source unit 7, such as a multimode optical fiber having a core diameter of 60 μm or less, or a single-mode optical fiber having a core diameter of around 10 μm.

In another embodiment, a portion of the optical fiber 2 in the vicinity of the output end 2a may be tapered such that the cross-sectional area of the core at the output end 2a is smaller than the cross-sectional area of the core at a position nearer to the light source unit 7 than the output end 2a. With this structure, a high-NA component of the laser light L guided through the optical fiber 2 is excited, and this makes the residual polarized component RP, which is reduced by the mode coupling between multiple modes of the laser light L inputted to the multimode optical fiber 5, even smaller.

Figure 4A:
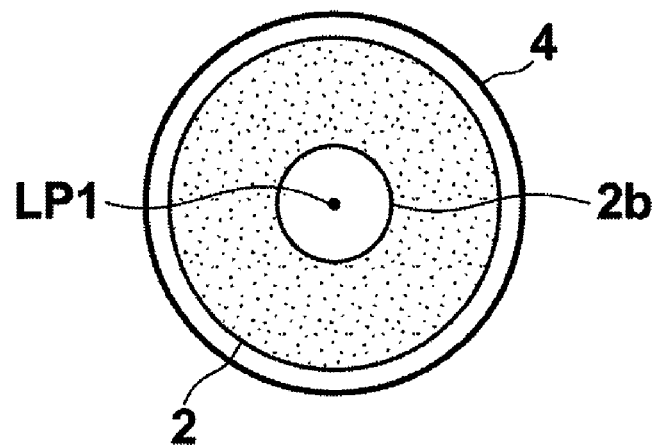
FIG. 4A is a sectional view at an output end 2a of a optical fiber 2.

Next, connection between the optical fiber 2 and the multimode optical fiber 5 is described. FIG. 4A is a sectional view at the output end 2a of the optical fiber 2, FIG. 4B is a sectional view at the input end 5b of the multimode optical fiber 5, and FIG. 4C is a sectional view at the output end 2a of the optical fiber 2 in an offset position.

Figure 4B:
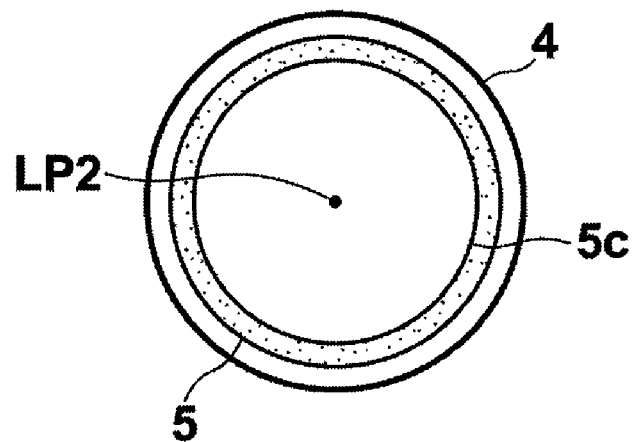
FIG. 4B is a sectional view at an input end 5b of a multimode optical fiber 5.

As shown in FIGS. 4A and 4B, the optical fiber 2 and the multimode optical fiber 5 are connected such that an optical axis LP1 at the output end 2a and an optical axis LP2 at the input end 5b are coaxial with each other. Although the optical fiber 2 is connected to the multimode optical fiber 5 via the optical connector 4 in this embodiment, this is not intended to limit the invention. For example, the optical fiber 2 may be connected to the multimode optical fiber 5 by fusion splicing.

Figure 4C:
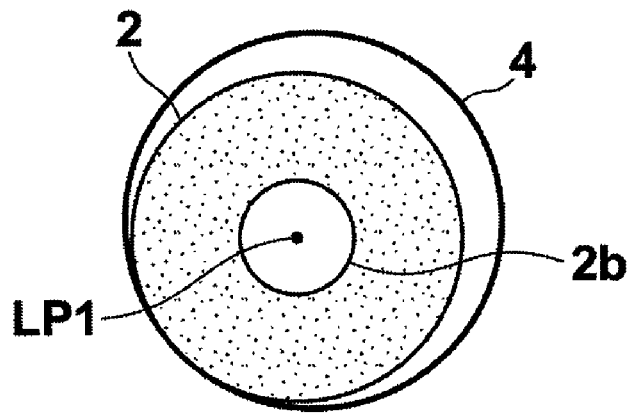
FIG. 4C is a sectional view at the output end 2a of the optical fiber 2 in an offset position.

In another embodiment, as shown in FIG. 4C, the optical fiber 2 is fixed with a thermoset epoxy material, or the like, in a position where the optical fiber 2 is offset from the axis of a ferrule of the connector 4. That is, the optical fiber 2 may be connected to the multimode optical fiber 5 at an offset position, where the optical axis LP1 at the output end 2a is substantially parallel to the optical axis LP2 at the input end 5b of the multimode optical fiber 5 and is spaced apart from the optical axis LP2 by a fixed distance along a plane that is perpendicular to the optical axis. The offset is also achievable by using the optical fiber 2 having a smaller outer diameter. The amount of offset is within the range where, when a core 2b of the optical fiber 2 is projected onto a core 5c at the input end of the multimode optical fiber 5, the core 2b is positioned within the extent of the core 5c of the multimode optical fiber 5. With this structure, the laser light L outputted from the output end 2a of the optical fiber 2 enters in the vicinity of the circumference of the core 5c of the multimode optical fiber 5, and this provides a larger optical path difference of the laser light L in the multimode optical fiber 5 to achieve a smaller residual polarized component RP.

The vibration applied by the actuator 6 makes the speckle pattern of the laser light L with reduced coherence vibrate within the illuminated area to produce a superimposed speckle pattern. Specifically, the actuator 6 in this embodiment is formed by a vibration motor and applies vibration with an amplitude of about 1 mm as a modulation to the multimode fiber 5. However, this is not intended to limit the invention. As described above, for the laser light L with a smaller amount of the residual polarized component RP outputted from the multimode optical fiber 5, the visually recognizable level of speckle reduction can be achieved with a smaller amplitude of the vibration. Therefore, if the residual polarized component RP of the laser light L is sufficiently small, the actuator may be formed by a piezoelectric device with an amplitude of several μm. Further, although the intensity modulation is achieved by applying the vibration to the multimode optical fiber 5 using the actuator 6 in this embodiment, this is not intended to limit the invention. For example, the intensity modulation may be achieved by applying a physical torsion or tension to the mode coupling in the multimode optical fiber 5.

In the laser light source device 1 of the invention, the laser light L emitted from the laser module 3 is inputted to the multimode optical fiber 5, and the residual polarized component RP of the laser light L is reduced by the mode coupling between multiple modes in the multimode optical fiber 5. Thus, the intensity modulation is applied by the actuator 6 in the state where the coherence of the laser light L is sufficiently reduced, thereby achieving the visually recognizable level of speckle reduction in the near-field pattern NFP at the output end of the multimode optical fiber 5. Further, since the laser light source device 1 of the invention does not employ the fiber bundle formed by optical fibers having fiber lengths LE that differ from each other by a length not less than the coherence length, the laser light source device 1 of the invention can easily been manufactured and the production cost thereof is not increased.

Thus, the laser light source device 1 of the invention can inexpensively achieve the visually recognizable level of speckle reduction.

According to the laser light source device of the invention, the residual polarized component of the laser light outputted from the second optical waveguide is reduced by guiding the laser light through the second optical waveguide. By applying intensity modulation to the second optical waveguide in a state where the coherence of the laser light is sufficiently reduced, a visually recognizable level of speckle reduction can be achieved. Since it is not necessary to provide an optical fiber bundle, or the like, to the laser light source device, increase of the production cost can be avoided. Thus, the visually recognizable level of speckle reduction can inexpensively be achieved by reducing the coherence of the laser light.

What is claimed is:
1. A laser light source device comprising:
a laser module comprising a light source and a first optical waveguide, wherein light emitted from the light source is outputted from an output end of the first optical waveguide;
a second optical waveguide connected to the first optical waveguide, wherein the light outputted from the output end of the first optical waveguide is inputted to an input end of the second optical waveguide and guided through the second optical waveguide; and
an intensity modulation unit disposed in the vicinity of the second optical waveguide, the intensity modulation unit applying intensity modulation to the second optical waveguide,
wherein a core diameter at the input end of the second optical waveguide is larger than a core diameter at the output end of the first optical waveguide, wherein
the first optical waveguide is connected to the second optical waveguide in a position where an optical axis at the output end of the first optical waveguide is offset from an optical axis at the input end of the second optical waveguide, and
a core at the output end of the first optical waveguide is positioned within an extent of a core at the input end of the second optical waveguide in the offset position.
2. The laser light source device as claimed in claim 1, wherein a cross-sectional area of the core at the output end of the first optical waveguide is smaller than a cross-sectional area of the core at a position nearer to a light source than the output end.

3. The laser light source device as claimed in claim 1, wherein
- the first optical waveguide is an optical fiber having a core diameter of 33 µm, and
- the second optical waveguide is a multimode optical fiber having a core diameter selected from 60 µm, 205 µm and 230 µm.

4. The laser light source device as claimed in claim 3, wherein the second optical waveguide has a fiber length adapted to achieve a residual polarized component of the light outputted from the second optical waveguide of about 30% or less.

5. The laser light source device as claimed in claim 1, wherein the intensity modulation unit comprises an actuator for applying 5 vibration.

6. The laser light source device as claimed in claim 5, wherein the actuator comprises a vibration motor.

7. The laser light source device as claimed in claim 5, wherein the actuator comprises a piezoelectric device.

* * * * *